United States Patent
Baxendale et al.

[15] 3,702,603
[45] Nov. 14, 1972

[54] INTERNAL COMBUSTION ENGINES

[72] Inventors: Albert Edward Baxendale; Edward John Young, both of Coventry, England

[73] Assignee: Brico Engineering Limited, Coventry, England

[22] Filed: Nov. 13, 1970

[21] Appl. No.: 89,279

[30] Foreign Application Priority Data

Nov. 21, 1969 Great Britain..........57,186/69

[52] U.S. Cl............123/97 B, 123/102 R, 123/124 B
[51] Int. Cl. .........................F02d 11/10, F02d 9/00
[58] Field of Search .123/97 B, 124 R, 119 D, 102 R, 123/124 B

[56] References Cited

UNITED STATES PATENTS

| | | | |
|---|---|---|---|
| 2,509,755 | 5/1950 | Baldine | 123/124 B |
| 2,886,020 | 5/1959 | Wolfe | 123/97 B X |
| 3,287,899 | 11/1966 | Bintz | 123/119 D |
| 3,568,651 | 3/1971 | Waag | 123/102 |
| 3,599,426 | 8/1971 | Oberdorfer, Jr. | 123/97 B |
| 3,601,103 | 8/1971 | Swider | 123/102 |
| 3,601,106 | 8/1971 | Nakajima | 123/97 B |

FOREIGN PATENTS OR APPLICATIONS

632,093 7/1936 Germany...............123/119 D

*Primary Examiner*—Wendell E. Burns
*Attorney*—Holcombe, Wetherill & Brisebois

[57] ABSTRACT

An internal combustion engine is provided with valve means for admitting air to the engine inlet manifold downstream of the throttle valve, and the valve means is operative to pass air to the inlet manifold under engine over-run conditions when the throttle valve is closed, the supply of fuel is cut-off and the engine speed is substantially above idling speed.

There is also described a fuel injection system having a plurality of fuel injection valves arranged to supply fuel to an engine and including means which are operative, after the supply of fuel has been cut-off during engine over-run conditions, to deliver fuel to the engine via a plurality of the fuel injection valves simultaneously.

2 Claims, 6 Drawing Figures

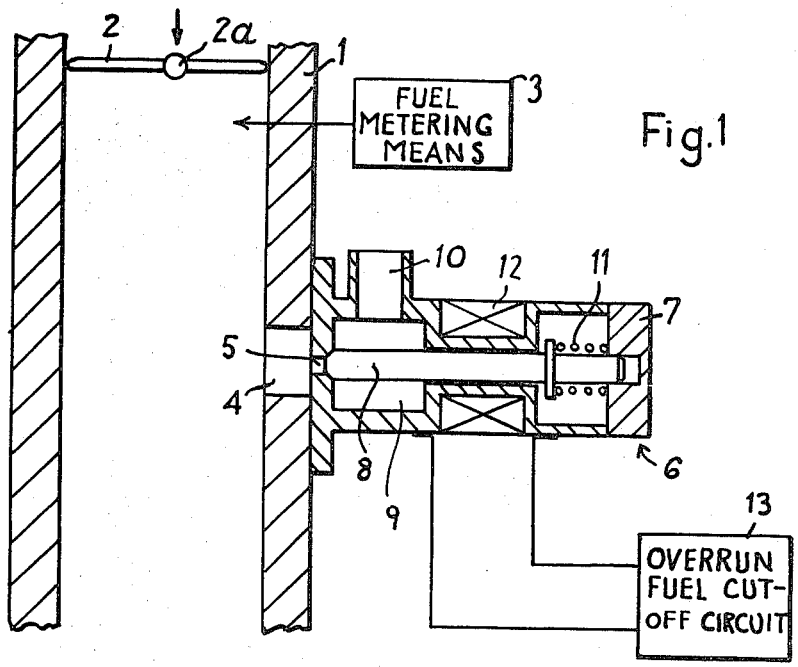
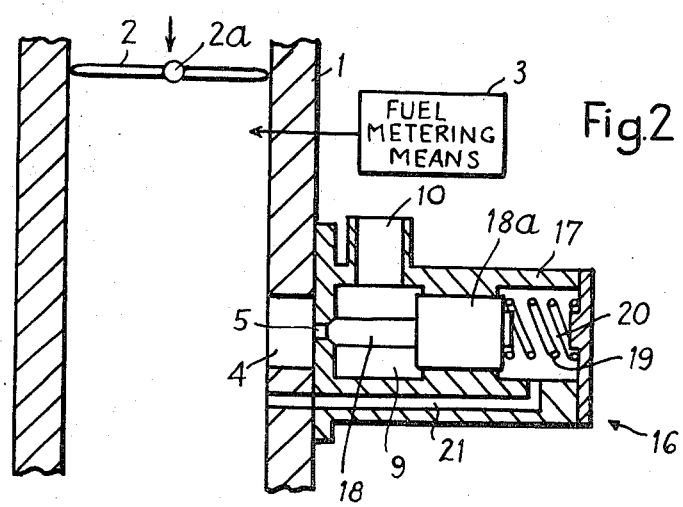
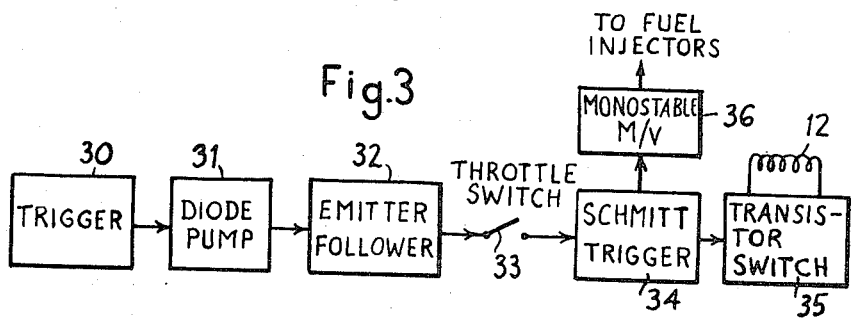

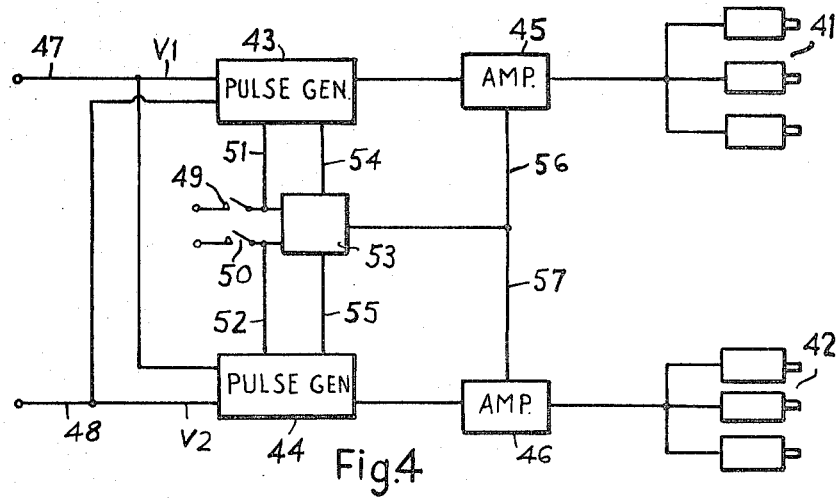
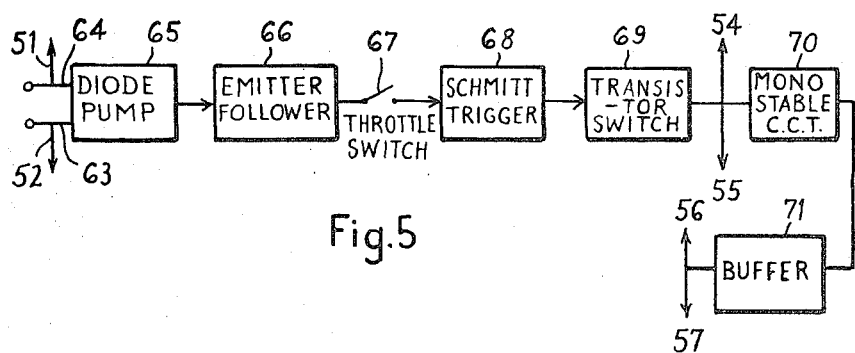
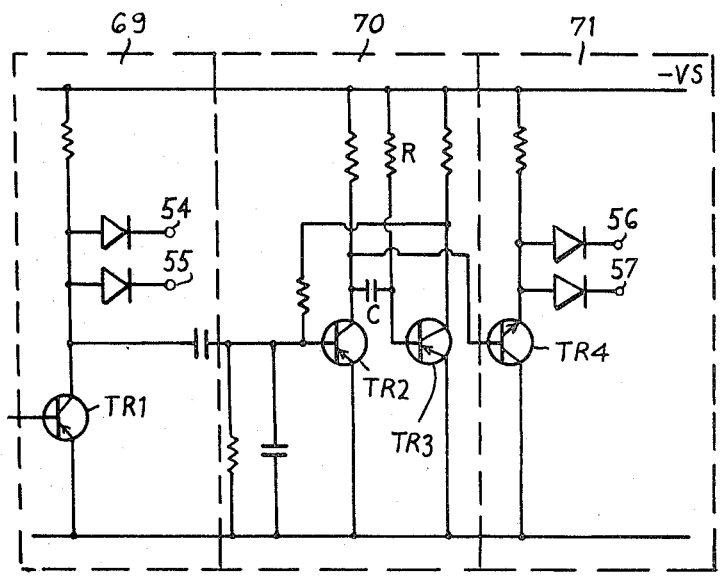

INTERNAL COMBUSTION ENGINES

The present invention relates to internal combustion engines.

From one aspect the invention provides an internal combustion engine including means for admitting air into the induction system of the engine under over-run conditions.

Over-run conditions are defined as those pertaining when the engine throttle valve is closed or substantially closed, the supply of fuel is cut-off or substantially reduced and the engine operating speed is substantially above its idling speed. The air may be admitted into the induction system through valve means which are opened under engine over-run conditions.

From another aspect the invention provides an internal combustion engine having an inlet manifold, a throttle valve for controlling the induction of air into the inlet manifold and fuel metering means for supplying fuel to the engine wherein there is provided further valve means for admitting air to the inlet manifold downstream of the throttle valve and means for opening said further valve means to pass air when said throttle valve is closed or substantially closed, the supply of fuel is cut-off or substantially reduced and the engine speed is substantially above idling speed. The fuel metering means may either supply metered quantities of fuel into the inlet manifold or direct into the engine cylinder or cylinders.

According to one embodiment of the invention, the valve means controlling the supply of air under over-run conditions may comprise a solenoid operated valve, the solenoid being energized to open the valve under over-run conditions. The arrangement may either be such that the solenoid is energized to open the valve throughout the period when over-run conditions exist, or alternatively the solenoid may only be energized to open the valve during the initial period of over-run conditions, e.g. for the first few seconds.

According to a further embodiment, the valve means controlling the supply of air under over-run conditions may be a pressure operated valve which is operated to an open position under engine over-run conditions.

The throttle valve preferably comprises a butterfly valve which is pivotable about a transverse axis within the inlet manifold and which in its closed position is normal to the axis of the inlet manifold.

According to yet another aspect of the invention there is provided a fuel injection system for an internal combustion engine having fuel injection valves arranged to supply fuel to the engine and means operative, after the supply of fuel to the engine has been cut-off or substantially reduced during engine over-run conditions, to deliver fuel to the engine via a plurality of the fuel injection valves simultaneously.

The invention also provides a fuel injection system for an internal combustion engine which includes a plurality of groups of fuel injection valves, a separate pulse generator connected to each group of valves to control the operation thereof, a control circuit connected to the pulse generators to provide a signal inhibiting the operation of or output from the generators during engine over-run conditions and a further pulse generator connected to all the groups of injection valves to cause their simultaneous operation for a predetermined period upon the termination of engine over-run conditions. The simultaneous operation of the injection valves may occur either when the throttle valve is opened after over-run conditions or when the engine speed falls towards the idling speed.

The invention will now be further described by way of example with reference to the accompanying drawings, in which:

FIG. 1, is a diagrammatic view of one arrangement according to the invention including a solenoid operated valve shown in section, FIG. 2, is a diagrammatic view of a further arrangement including a vacuum operated valve shown in section, FIG. 3, is a block diagram of an over-run fuel cut-off circuit, FIG. 4, is a block schematic diagram of one embodiment of fuel injection system according to the invention, FIG. 5, is a block schematic diagram in more detail of a part of the circuit of FIG. 4, and FIG. 6, is a circuit diagram of part of the circuit shown in FIG. 5.

Referring to FIG. 1, the engine is provided with a circular-section inlet manifold 1 containing a butterfly throttle valve 2 which is pivotally mounted on a transverse spindle 2a. The throttle valve 2 is arranged so that when in its closed position it is normal to the axis of the inlet manifold 1 (as shown). It may take the form of a thin circular disc, the periphery of which may be part-spherical for a better fit within the inlet manifold 1. A small angular rotation of the throttle valve 2 from its closed position will produce relatively little opening of the valve, which ensures that a progressively increasing supply of air is provided for the engine as the throttle valve 2 is moved from its closed position. In contrast, conventional inlet manifold throttle valves are usually arranged, when closed, to be at a small acute angle to a plane normal to the axis of the inlet manifold. A small initial movement of this conventional throttle valve produces a relatively large opening of the valve.

The inlet manifold 1 is provided, downstream of the throttle valve 2, with fuel metering means 3 consisting of one or more fuel injection valves, which serve to meter the fuel into the inlet manifold upstream of the engine inlet valves. The wall of the inlet manifold contains a port 4 over which is mounted the outlet 5 of a solenoid actuated valve 6 for controlling the admission of air to the inlet manifold under engine over-run conditions. This solenoid actuated valve comprises a housing 7 in which is slidably mounted a valve stem 8, one end of which normally closes-off the outlet 5 from a chamber 9. Air is admitted to the chamber 9 through the inlet 10 and the valve stem 8 is normally held in the position to close the outlet 5 by means of a spring 11. Surrounding a portion of the valve stem is a solenoid winding 12 which is arranged such that when the winding is energized, the valve stem 8 moves axially against the action of the spring 11 so that the outlet 5 is opened, whereby air from inlet 10 can pass through the chamber 9, the outlet 5 and port 4 into the inlet manifold. The energization of the solenoid is controlled by an over-run fuel cut-off circuit 13 which energizes the solenoid under engine over-run conditions i.e. when the throttle valve is closed or substantially closed, the supply of fuel is cut-off or substantially reduced and the engine speed is substantially above idling speed.

Referring now to the embodiment of FIG. 2, the arrangement is basically similar to that in FIG. 1 except that instead of a solenoid operated valve 6 a vacuum operated valve 16 is employed. Moreover, in this embodiment the fuel metering means may either be one or more fuel injection valves, as described in the embodiment of FIG. 1, or may be a carburetor.

The valve 16 comprises a housing 17 containing an axially slidable valve stem 18 which is normally urged by means of a spring 19 to close off the outlet 5 from the chamber 9 to which the air is admitted through inlet 10. The spring 19 is located in a chamber 20 behind the head 18a of the valve stem 18 and this chamber is connected through a duct 21 with the inlet manifold. Under engine over-run conditions when a partial vacuum is created in the inlet manifold, this partial vacuum is applied through the duct 21 to draw the valve stem 18 against the action of the spring 20 to open the outlet 5, whereby air may again be admitted through the chamber 9 and the port 4 to the inlet manifold.

One form of the over-run fuel cut-off circuit 13 is shown in FIG. 3. A trigger device 30 operates at the firing frequency of the engine and hence produces trigger pulses at a repetition rate proportional to engine speed. The trigger device may be a contact assembly driven by the engine and which is fed with a voltage so as to produce a trigger pulse each time that the contacts close. The trigger pulses are fed to a diode pump circuit 31 which produces a D.C. voltage proportional to engine speed. This voltage is fed through an emitter follower stage 32 and a throttle switch 33 to a Schmitt trigger circuit 34. The throttle switch is closed only when the engine throttle valve is closed. If the D.C. voltage proportional to engine speed is above a chosen level, the Schmitt trigger circuit produces an output to operate a transistor switch 35 so as to energize the solenoid 12 and thereby open the valve 6 to admit air to the inlet manifold.

When the throttle switch is opened or the engine speed falls below the chosen level, the Schmitt trigger circuit output causes the transistor switch to open and hence the solenoid 12 is de-energized, and the valve 6 closes.

With the above arrangement the valve 6 is open throughout the period when over-run conditions exist.

If it is desired that the valve 6 should only be open during the initial period of over-run conditions, e.g. for one or two seconds, the transistor switch 35 may be in the form of a monostable multivibrator having the period of its unstable state equal to the time for which the valve 6 is to be opened. When triggered to its unstable state by the output from the Schmitt trigger circuit, the multivibrator closes the transistor switch causing energization of the solenoid 12 and opening of the valve 6. However when the multivibrator reverts to its stable state, after the period determined by its time constant, the solenoid is de-energized and the valve 6 is closed, even though over-run conditions still exist.

The arrangements according to the present invention may be incorporated in a fuel injection system as described in specification No. 3272187 or combined with the arrangements described in the specification of our copending application Ser. No. 811,914; which discloses means for the control of fuel injection valves under engine over-run conditions.

In fuel injection systems where the fuel injection valves are maintained closed during over-run conditions in order to cut-off the supply of fuel, it may be desirable to open all of the fuel injection valves simultaneously to deliver a predetermined amount of fuel as the throttle is opened at the end of over-run conditions. This can be achieved by using the output from the Schmitt trigger circuit 34 of FIG. 3 to trigger a monostable multivibrator 36 as the throttle switch 33 is opened; this multivibrator producing energizing pulses which are fed via amplifiers to energize all of the fuel injection valves, whereby the valves open to pass an amount of fuel determined by the duration of the unstable period of the multivibrator. This arrangement is operative either when the switch 33 is opened or when the engine speed falls below the chosen level.

The admission of air to the induction system of an internal combustion engine under over-run conditions serves to purge the products of combustion from the engine cylinders and exhaust system or burn more effectively any fuel admitted to the cylinders during the over-run condition. This in turn serves to control the exhaust emission during engine over-run conditions.

Referring now to FIG. 4, there is shown an arrangement for controlling the energization of two groups 41 and 42, of electromagnetically operated fuel injection valves of an internal combustion engine. The operation of these groups of valves is controlled by energizing pulses produced during alternate periods of time for the respective pulse generators 43 and 44, and which are fed to the fuel injection valves via amplifiers 45 and 46.

The pulse generators 43 and 44 are triggered into operation by means of signals obtained from trigger switches 49 and 50, operated at a rate depending upon the engine speed, and applied to the respective generators via leads 51 and 52. The duration of the output pulses from the pulse generators 43 and 44 are in turn controlled by input signals $V_1$ and $V_2$, fed over leads 47 and 48, and which are variable according to different parameters of engine operation. In this particular embodiment the input signal $V_1$ varies as a function of both engine inlet manifold pressure and engine speed, while the signal $V_2$ varies as a function of engine water temperature and engine acceleration. The fuel injection valves of groups 41 and 42 are opened by the output pulses from the generators 43 and 44 for periods depending on the duration of the output pulses in order to pass fuel to the engine. The pulse generators and circuits for generating the control voltages V1 and V2 may be described in specification No. 3272187 and the fuel injection valves may be as described in specification No. 3247833.

Outputs from the trigger switches 49 and 50 are also applied to a control circuit 53 which includes a throttle switch (not shown) operated according to the position of the engine throttle valve so that when the throttle valve is closed and the engine speed is substantially above idling speed, outputs may be derived from the control circuit 53 on the leads 54 and 55 to inhibit the outputs from the generators 43 and 44, whereby the injection valves in the groups 41 and 42 are maintained closed and the supply of fuel to the engine is cut-off. It may be arranged, as previously described, that as the supply of fuel is cut-off during engine over-run conditions, air is admitted to the induction system of the engine in order to purge the system of fuel during this period.

When the throttle valve is initially opened after a period of fuel cut-off, it is advantageous for all of the injection valves to be energized simultaneously to deliver a predetermined amount of fuel. This is achieved by the control circuit 53 which provides output pulses on leads 56 and 57 to the amplifiers 45 and 46, thus resulting in signals being fed by the amplifiers to energize the two groups 41 and 42 of injection valves simultaneously for a predetermined period of time. The simultaneous energizing of all the injection valves may either take place when the throttle valve is opened or when the engine speed falls towards idling speed.

Referring now to FIG. 5, there is shown a block schematic diagram illustrating the basic arrangement of the control circuit 53. Trigger pulses at a repetition rate proportional to the engine speed are fed from trigger switches 49 and 50 over leads 63 and 64 to a diode pump circuit 65 which produces a D.C. voltage proportional to engine speed. The output from the diode pump circuit 65 is fed via an emitter-follower stage 66 and a throttle switch 67 to a Schmitt trigger circuit 68. The throttle switch 67 is closed only when the engine throttle valve is closed. The output from the Schmitt trigger circuit 68 is connected to a transistor switch 69 and if the throttle switch 67 is closed and the engine speed is above a given value, the Schmitt trigger circuit 68 produces an output which operates the transistor switch 69. The output from switch 69 is fed over leads 54 and 55 to inhibit the output from the pulse generators 43 and 44 during over-run conditions when the throttle switch is closed and thereby prevent operation of the groups 41 and 42 of injection valves, so that the supply of fuel to the engine is cut-off.

The output signal from the switch 69 is also applied to a monostable circuit 70 whose output is fed via a buffer stage 71 and leads 56 and 57 to the amplifiers 45 and 46, as shown in FIG. 1. The arrangement is such that, at the end of a period of over-run when the throttle switch 67 is opened, the monostable circuit 70 is triggered as the transistor switch 69 goes to the "off" condition, and the pulse thus generated by the circuit 70 for the duration of its unstable state is applied via the buffer stage 71 and lines 56 and 57 to the amplifiers 45 and 46, in order to cause an energizing pulse of a predetermined duration to be applied to the groups 41 and 42 of fuel injection valves, and hence all of the valves to be opened to inject fuel for a given period of time.

Referring now to FIG. 6 transistor TR1 forms the transistor switch 69, having outputs 54 and 55 connected to the pulse generators 3 and 4 to inhibit their operation. Transistors TR2 and TR3 form a monostable multivibrator constituting the circuit 70 and transistor TR4 forms the buffer stage 71 feeding the connections 56 and 57. The duration of the unstable period and hence of the output signal from the monostable circuit 30 is determined by the component values of its time constant circuit, formed by the resistor R and the capacitor C.

With such an arrangement, at the end of an over-run period all of the fuel injection valves are opened simultaneously and deliver a predetermined amount of fuel to the engine according to the value of the time constant circuit RC. The simultaneous triggering of the injection valves takes place either when the throttle is opened, or when the engine speed falls towards the idling speed. This simultaneous injection from all of the injector valves serves to re-establish the film of fuel which normally adheres to the wall of the engine inlet manifold and which tends to dry up when the fuel is cut-off during over-run conditions.

We claim:

1. An internal combustion engine having an inlet manifold, a throttle valve for controlling the induction of air into the inlet manifold and fuel metering means for supplying fuel to the engine wherein there is provided a solenoid operated valve for admitting air to the inlet manifold downstream of the throttle valve, the solenoid being energized from an over-run fuel cut-off circuit which comprises a trigger device producing trigger pulses at a repetition rate proportional to engine speed which are fed to a diode pump circuit producing a D.C. voltage proportional to engine speed, said D.C. voltage being fed through a throttle switch, which is closed only when the engine throttle is closed, to a Schmitt trigger circuit producing an output operating a transistor switch to energize the solenoid and thereby opening the valve to admit air to the inlet manifold under over-run conditions, that is when said throttle valve is closed or substantially closed, the supply of fuel is cut off or substantially reduced and the engine speed is substantially above idling speed.

2. An internal combustion engine as claimed in claim 1, wherein the output from the Schmitt trigger circuit is used to trigger a transistor switch in the form of a monostable multivibrator having the period of its unstable state equal to the time for which it is desired that the valve should be opened.

* * * * *